Figure 1:
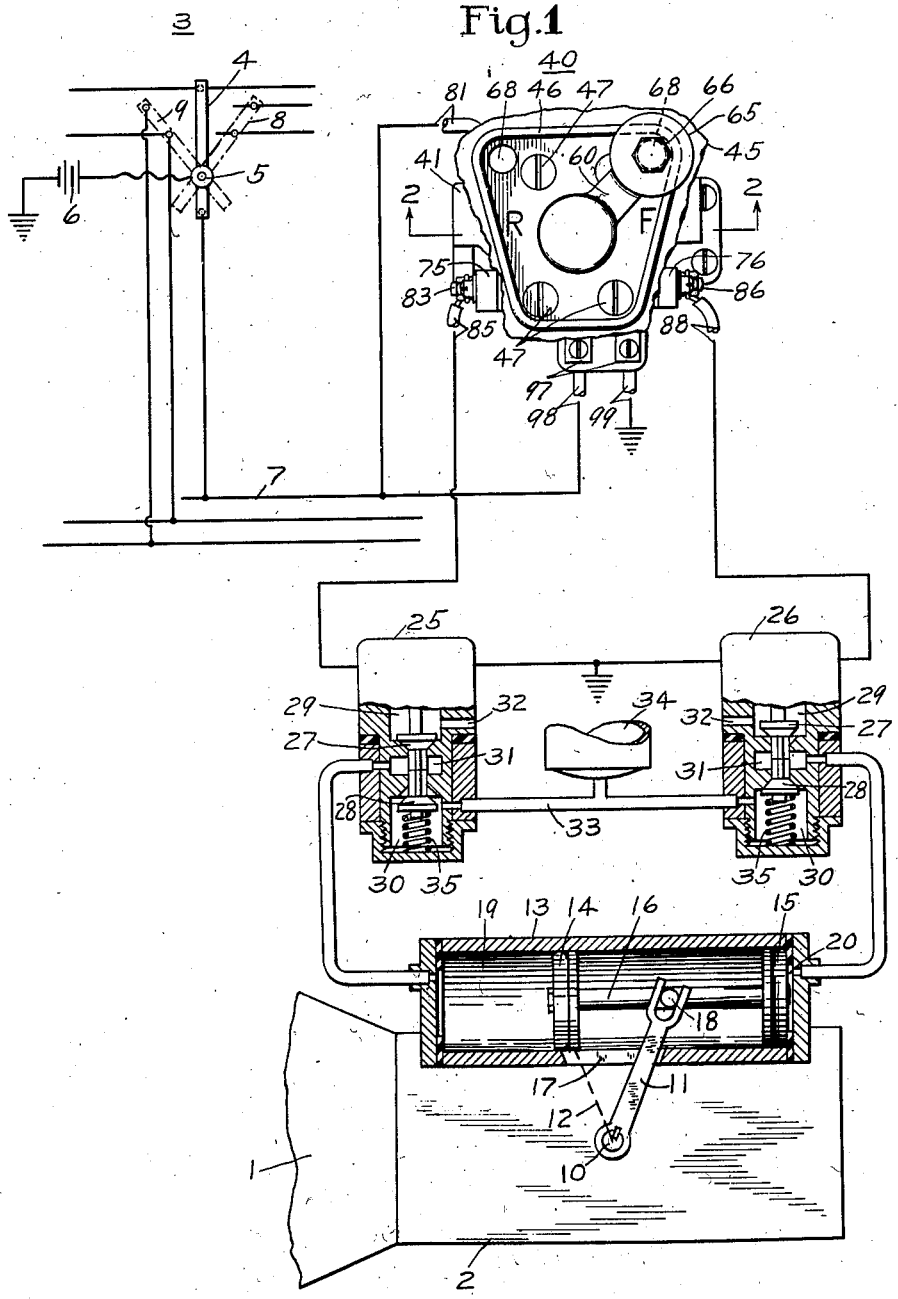

Dec. 29, 1942.                M. B. CAMERON                2,306,521
                            CONTROL MECHANISM
                    Filed Aug. 28, 1941          2 Sheets-Sheet 1

INVENTOR
Mortimer B. Cameron
BY
ATTORNEY

Dec. 29, 1942. M. B. CAMERON 2,306,521
CONTROL MECHANISM
Filed Aug. 28, 1941 2 Sheets—Sheet 2

INVENTOR
Mortimer B. Cameron
BY
ATTORNEY

Patented Dec. 29, 1942

2,306,521

UNITED STATES PATENT OFFICE 2,306,521

CONTROL MECHANISM

Mortimer B. Cameron, Edgewood, Pa., assignor to The Westinghouse Air Brake Company, Wilmerding, Pa., a corporation of Pennsylvania Application August 28, 1941, Serial No. 408,568

6 Claims. (Cl. 192—3.5)

This invention relates to control mechanisms and more particularly to the type employing a switch mechanism which is manually operative to selectively control different operations.

In my copending application Serial No. 347,822, filed July 27, 1940, and which has matured on April 14, 1942, into Patent No. 2,279,365, there is disclosed a control system for a clutch and a selective forward and reverse transmission of a vehicle of the type adapted to be operated by an internal combustion engine. This system embodies a clutch control switch having a neutral position for disengaging the clutch and at either side of said neutral position there is a drive position for effecting engagement of the clutch parts to transmit power from the propelling engine through the transmission to the vehicle drive wheels.

One object of the invention is the provision of an improved system of the above type.

In the above control system the selective conditioning of the forward and reverse transmission is dependent upon energization of a transmission control wire which is connected to the clutch control switch in such a manner as to be energized only in the neutral position of the switch. By this arrangement the condition of the transmission cannot be changed while the vehicle is being propelled in a chosen direction and this is desirable to prevent damage to the transmission, to other parts of the power transmitting system or to the vehicle.

Another object of the invention is the provision of a novel manually operative selector switch which is particularly adapted though not limited in use for selectively controlling the conditioning of the transmission above described upon energization of the transmission control wire in neutral position of the clutch control switch.

When the clutch control switch is in a drive position to cause movement of the vehicle in a chosen direction, the supply of electric current to the transmission control wire is cut off. Under this condition movement of the transmission selector switch from the position which determines the direction of vehicle travel would therefore have no effect upon the transmission, as will be apparent. However, assume that the selector switch were thus moved accidentally or otherwise, to a position for conditioning the transmission to provide for movement of the vehicle in the reverse direction, and that subsequently the clutch control switch were moved to neutral position to permit coasting of the vehicle down a grade. Under such a condition electric current would be supplied to the transmission selector switch and an undesired change in the condition of the transmission device would occur which might result in damage thereto or to other parts of the power transmission system or to the vehicle itself.

Another object of the invention is therefore the provision of a transmission selector switch embodying means for automatically locking same against movement when the clutch control switch is in a chosen drive position and providing for adjustment of the transmission selector switch when and only when the clutch control switch is moved to its neutral position.

Unless insured against or prevented, there is even a possibility that the position of the transmission selector switch might become undesirably changed, due possibly to being struck or leaned against by the operator or another person, while the vehicle was coasting down a grade with the clutch control switch in neutral position in which case a change in condition of the transmission might occur with disastrous results.

Another object of the invention is therefore the provision of a transmission selector switch which is so designed as to avoid accidental movement to a position for causing reversing of the transmission when the clutch control switch is in its neutral position.

Other objects and advantages will be apparent from the following more detailed description of the invention.

Description

Figure 2:
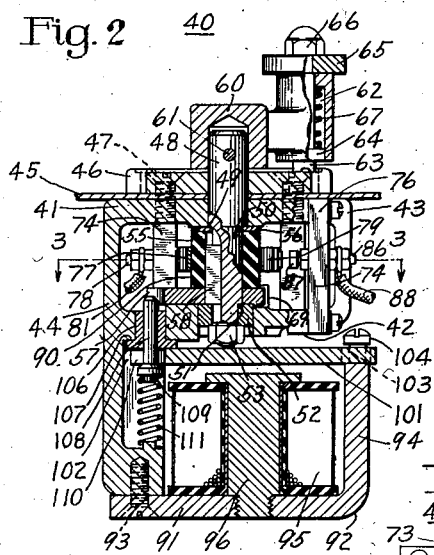
Figure 3:
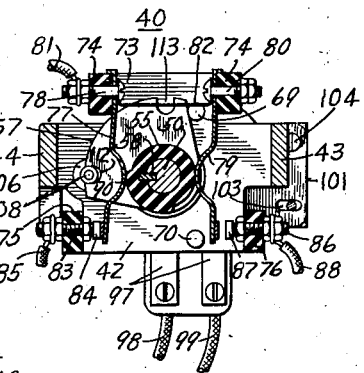
Figure 4:
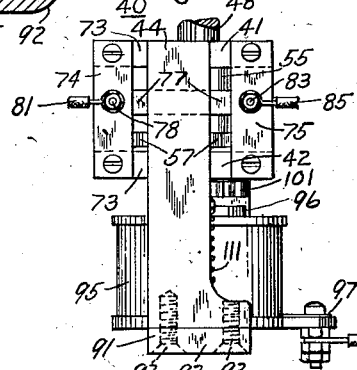
Figure 5:
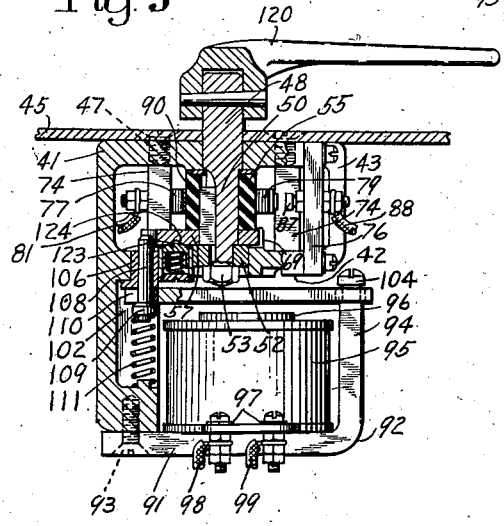
Figure 6:
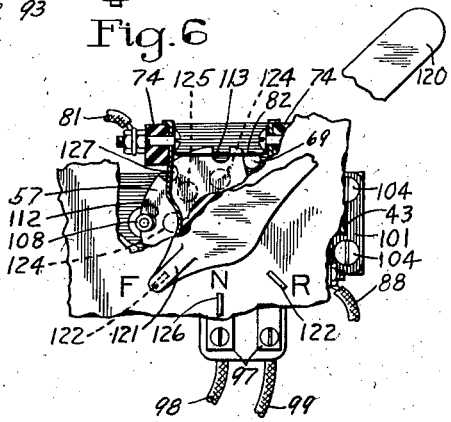

In the accompanying drawings; Fig. 1 is a diagrammatic view, partly in section and partly in outline, of a combined clutch and transmission control system embodying the improved transmission selector switch which is shown in plan; Fig. 2 is a sectional view of the transmission selector switch taken on the line 2—2 in Fig. 1; Fig. 3 is a sectional view of the selector switch taken on the line 3—3 in Fig. 2; Fig. 4 is a side view of the selector switch shown in Figs. 1 to 3; Fig. 5 is a sectional view similar to Fig. 2 of a modified form of transmission selector switch and Fig. 6 is a partial plan view of the selector switch shown in Fig. 5 and having certain parts broken away to show interior construction.

In Fig. 1 the reference numeral 1 indicates a portion of a clutch housing and the reference numeral 2 indicates a transmission housing. These housings are shown connected and the housing 1 is adapted to contain a clutch having two drive positions and an intermediate neutral or non-driving position, while the transmission housing 2 is adapted to contain mechanism adapted to provide for movement of a vehicle in either a forward or a reverse direction, said clutch and transmission being adapted to be interposed in the power transmitting connection between an internal combustion propulsion engine and the drive wheels of a vehicle for propelling the vehicle in a direction dependent upon the condition of the transmisison. These parts may be of any conventional structure and a more detailed description thereof therefore is not deemed essential to a clear understanding of the invention.

The reference numeral 3 indicates a clutch control switch comprising a manually movable switch member 4 which is mounted to turn on but is suitably insulated from a shaft 5 and which is constantly connected to one terminal of any suitable source of supply of electric current, such as a battery 6, the other terminal of which is grounded. The switch member 4 is provided for controlling the position of the clutch in the clutch housing 1 and has a neutral position, in which it is shown, for effecting movement of said clutch to its non-driving position. The switch member 4 is movable from its neutral position shown in either direction to one or another of two driving positions 8 or 9 for supplying electric current from the battery 6 to various wires for moving the clutch to one or the other of its two drive positions.

In neutral position of the switch member 4 it provides an electrical connection between the battery 6 and a transmission control wire 7, while in both drive positions this connection is broken. This supply of electric current to the transmission control wire 7 is provided in order that the condition of the transmission 2 can be changed to obtain a desired direction of movement of the vehicle. The conditioning of the transmission 2 is thus dependent upon energization of the wire 7 and since this occurs only in neutral position of the clutch control switch member 4 it should be noted that the condition of the transmission cannot be changed except when the clutch in housing 1 is disengaged or is in its non-driving position.

Since reference may be made to my copending application above referred to which discloses and describes in detail the arrangements whereby the conditioning of the clutch in housing 1 under the control of the clutch control switch 3 is obtained a further description of the above parts will be omitted in the present application.

Projecting through one side of the transmission housing 2 is a transmission control shaft 10 which is rockable to two different positions to condition the transmission within the housing to provide for movement of the vehicle in either one direction or the opposite direction. For thus rocking the shaft 10 one end of an arm 11 is secured thereto. In the drawing the shaft 10 and arm 11 are shown in the position which it may be assumed they will occupy to condition the transmission to provide for forward movement of the vehicle. To provide for reverse movement of the vehicle said shaft and arm may occupy a position such as indicated by the dash line 12.

Mounted on one side of the transmission housing 2 above the shaft 10 is a shifting engine 13 which comprises a casing containing two pistons 14 and 15. These pistons are spaced apart and connected together for movement in unison by a rod 16. The arm 11 extends through a slot 17 in the casing and its inner bifurcated end straddles a pin 18 projecting from the rod 16 to provide an operating connection between the two pistons 14 and 15 and the transmission control shaft 10.

The piston 15 is shown in contact with one end of the casing to which position it is adapted to be moved by fluid under pressure supplied to a pressure chamber 19 at the outer face of piston 14 for rocking the arm 11 and shaft 10 to their forward drive positions shown. At the outer face of piston 15 is a pressure chamber 20 to which fluid under pressure is adapted to be supplied for moving the pistons in the opposite direction until piston 14 engages the opposite end of the casing for thereby rocking the arm 11 and shaft 10 to the reverse drive position indicated by the dotted line 12. This movement of the pistons 14 and 15 by fluid pressure supplied to either chamber 19 or 20 is dependent upon the chamber not being supplied with fluid under pressure being open to the atmosphere, as will be apparent.

The supply of fluid under pressure to chambers 19 and 20 and the opening of said chambers to the atmosphere is adapted to be controlled by a forward electromagnet valve device 25 and a reverse electromagnet valve device 26, respectively. Both of these electromagnet devices may be of identical structure, each comprising a magnet and two oppositely arranged valves 27 and 28 which are contained in chambers 29 and 30 and which have fluted stems engaging each other in an intermediate chamber 31. The chamber 29 in each of the two magnet devices is open to the atmosphere through a port 32 while the chamber 30 in each is connected to a pipe 33 adapted to be constantly supplied with fluid under pressure from any suitable source such as a reservoir 34. The chamber 31 in the magnet device 25 is connected to chamber 19 in the shifting engine 13 and the corresponding chamber in the magnet device 26 is connected to chamber 20 in said shifting engine. When the electromagnet devices are energized, the valves 27 are adapted to be seated and the valves 28 unseated and when deenergized a coil spring 35 in chamber 30 of each acting on the valve 28 therein is adapted to seat valve 28 and unseat the valve 27.

When either one of the electromagnets 25 or 26 is deenergized, the other is adapted to be energized as will be later brought out. Let it be assumed that the electromagnet 26 is deenergized under which condition pressure chamber 20 in the shifting engine 13 will be open past the valve 27 to the atmosphere. With the electromagnet 25 energized at this time the valve 28 will be unseated so as to supply fluid under pressure from the reservoir 34 to pressure chamber 19 in the shifting engine 13 which pressure acting on piston 14 will move said piston and thereby the piston 20 and transmission shifting arm 11 and shaft 10 to their forward drive positions shown. In order to move the transmission shifting arm 11 and shaft 10 to the reverse drive position indicated by dash line 12 the electromagnet 25 is adapted to be deenergized for opening the pressure chamber 19 to the atmosphere while the electromagnet device 26 is adapted to be energized for supplying fluid under pressure from the reservoir 34 to pressure chamber 20 for actuating the pistons 15 and 14 to their reverse drive position at the left-hand end of the shifting engine 13, as will be apparent.

Electric current for energizing the electromagnet devices 25 and 26 is adapted to be obtained from the transmission control wire 7 when, and only when, the clutch control switch member 4 is in neutral position shown and this supply of current is adapted to be selectively controlled to said electromagnets by a transmission control or reversing switch indicated generally by the reference numeral 40.

The transmission control switch 40 comprises two parallel arranged plate like members 41 and 42 which are spaced apart and formed integral with a rib 43 connecting one side of the plates and a rib 44 connecting the plates at the opposite side. The outer face of the plate 41 is adapted to be mounted against one side of a bracket member 45 which may be so located as to position the selector switch for convenient operation by the operator of the vehicle. Mounted against the opposite side of bracket member 45 is an escutcheon plate 46. Screws 47 extending through plate 46 and member 45 and having screw threaded engagement the plate like member 41 are provided for rigidly securing the switch to the member 45.

The members 41, 42 and 45 and the escutcheon plate 46 are provided with aligned bores through which extends a switch operating shaft 48. This shaft is journalled in the bore in member 41 and below said bore is provided with a shoulder 49 at the junction of the journaled portion and a portion 50 of smaller diameter. The lower end of the shaft extending through the plate like member 42 is of smaller diameter than portion 50 to provide a shoulder 51 for engagement by a sleeve-like bearing member 52 which is journaled in the plate 42 and secured on the shaft by a nut 53 having screw-threaded engagement therewith.

Mounted on the shaft 48 between the plate like members 41 and 42 is a switch operating cam 55 which is clamped by the nut 53 between a washer 56 engaging the shoulder 49 and a quadrant 57 which is disposed between said cam and the bearing member 52. The cam 55 and quadrant 57 are secured against turning relative to the shaft 48 by means of a key 58 which is disposed in a slot in said shaft and extends into slots in said cam and quadrant. One purpose of the bearing ring 52 is to provide for assembling of the key 58 to its working position shown and for then holding said key in such position.

An operating lever 60 is mounted on the end of the shaft extending beyond the escutcheon plate 46 and is connected thereto by means of a pin 61 for turning said shaft to a forward position and to a reverse position indicated by the legends F and R shown on the escutcheon plate 46 in Fig. 1.

In the end of lever 60 opposite that connected with the shaft 48 is a bore 62 formed with its axis parallel to that of the shaft 48. This bore is open at the end adjacent the escutcheon plate 46 and closed at its opposite end and extending through said bore and a suitable bore in the closed end thereof is a plunger 63. A washer 65 is secured by a nut 66 to the end of the plunger projecting beyond the closed end of bore 62. Within the bore 62 adjacent the open end thereof the plunger is provided with a guide portion 64 between which and the closed end of the bore is interposed a coil spring 67 which is under compression and therefore effective to urge the plunger in the direction of the escutcheon plate 46.

In each of the forward and reverse positions of the lever 60 the escutcheon plate is provided with a bore 68 into which the end of plunger 63 is adapted to be forced by the spring 67. In order to move the lever 60 from one of its positions to the other the plunger 63 must be first manually withdrawn from one or the other of the bores 68 and to accomplish this the operator must grasp the washer 65 and draw the plunger out of said bore against the force of the spring 67.

Extending upwardly from the plate like member 42 are two projections 69 and 70 arranged to be engaged by the opposite sides of the quadrant 57 in the two different operating positions of the lever 60 for limiting movement of said lever and thus defining said operating positions. The bores 68 are located to receive the plunger 63 in the positions defined by contact between the quadrant 57 and the projections 69 and 70.

At one side of the shaft 48 the two members 41 and 42 are provided with like outwardly extending portions 73 arranged one above the other and carrying on their opposite ends two bars 74 which are preferably made of material non-conductive to electricity. A like pair of bars 75 and 76 are carried by spaced parts of the plates 41 and 42 at the opposite side of the shaft 48. A contact finger 77 extends past one side of the cam 55 with one end disposed adjacent the bar 75 while the opposite end is secured by a screw 78 to one of the bars 74. An oppositely arranged contact finger 79 at the opposite side of cam 55 has one end rigidly secured by a screw 80 to the other bar 74. The screw 78 is connected by an electrical conductor 81 to the transmission control wire 7 leading to the clutch control switch device 3 and by an electrical connector 82 to the screw 80 whereby both of the flexible contact fingers 77 and 79 are connected with the transmission control wire 7.

The contact bar 75 carries a screw 83 having on one end a fixed contact 84 aligned for engagement by the adjacent movable end of the contact finger 77. The screw 83 is also connected to an electrical conductor 85 which leads to one terminal of the magnet of the electromagnet device 25, the other terminal of which is grounded.

The contact bar 76 carries a screw 86 having on one end a fixed contact 87 aligned for engagement by the adjacent end of the flexible contact finger 79. This screw is connected to an electrical conductor 88 which leads to one terminal of the magnet of the reverse magnet valve device 26, the other terminal of which is grounded.

The two contact fingers 77 and 79 are made of resilient material and are stressed so as to be constantly urged into contact with diametrically opposite portions of the cam 55. The cam has a lobe 90 adapted upon engagement with either one or the other of the two contact fingers to deflect same into contact with the respective fixed contact 84 or 87. When the lobe 90 is out of contact with the fingers, said fingers are adapted to spring out of contact with their respective fixed contact 84 or 87. This lobe is so arranged with respect to the operating handle 60 that when said handle is in the forward position, as shown in Fig. 1, the contact finger 77 will be in engagement with the fixed contact 84, as shown in Fig. 3, for thereby connecting the transmission control wire 7 to the forward electromagnet device 25. When the operating handle 60 is in its other or reverse position, the lobe 90 is adapted to be positioned for holding the contact finger 79 in engagement with the fixed contact 87 to thereby connect the reverse electromagnet device 26 with the transmission control wire 7, it being noted that when either of the contact fingers is in engagement with its respective fixed contact, the other contact finger opens the circuit controlled thereby.

Thus whenever the clutch control switch member 4 is in neutral position shown causing disengagement of the clutch on the vehicle and supplying electric current to the transmission control wire 7, the operator by moving the handle 60 of the transmission selector switch 40 to either its forward position or reverse position, as desired, may selectively control the energization and deenergization of the electromagnet devices 25 and 26 to cause the shifting engine 13 to rock the arm 11 and shaft 10 to a selected position for providing movement of the vehicle in the desired direction upon subsequent movement of the clutch control switch member 4 to one or the other of its driving positions 8 or 9. It will be noted that this selective conditioning of the transmission control arm 11 and shaft 10 is obtainable only when electric current is supplied to the control wire 7 and thus only when the clutch on the vehicle is in its disengaged position.

The rib 44 connecting the plate like members 41 and 42 of the transmission selector switch extends below the plate like member 42 and to its lower end the end of a leg 91 of a L-shaped bracket 92 is secured by screws 93. The other leg 94 of the bracket 92 extends upwardly in the direction of the plate like member 42.

The bracket 92 is provided for carrying a lock magnet comprising a coil 95 which is secured to the leg 91 by a core 96 having screw-threaded engagement with the leg. The two terminals of the coil 95 are connected by leads 97, to wires 98 and 99 connected respectively to the transmission control wire 7 and to ground as shown in Fig. 1.

An armature 101 is disposed above the upper end of the core 96 with one end extending over the end of the bracket leg 94 while the other end extends into a cavity 102 provided in the rib 44 below the plate like portion 42 of the switch. In the end of the armature 101 disposed above the bracket leg 94 there are provided two elongated openings 103 and through each of these openings a pin 104 extends and is secured to the bracket leg 94. The head of these pins are spaced slightly from the adjacent side of the armature 101 and this together with the elongated openings 103 provide for rocking movement of the armature 101 in a direction toward and away from the magnet core 96.

A bushing 106 is mounted in a suitable bore in the plate like member 42 and has at its lower end a collar 107 engaging the lower face of said member and adapted to be contacted by the armature 101 when the magnet coil 95 is deenergized. A lock pin 108 is mounted to slide in a bore through bushing 106 and extends through a slot 110 provided in the free end of armature 101. Below the armature the pin 108 has a head 109 of greater size than slot 110 so that movement of the armature in the direction of core 96 will move the pin 108 in the same direction. A coil spring 111 contained in cavity 102 of leg 44 is supported at one end on the closed end wall of said cavity while the opposite end bears against the head 109 of the lock pin 108. This spring is adapted to urge the lock pin 108 and armature 101 to the position shown in Fig. 2 when the magnet coil 95 is deenergized. When the coil 95 is energized to attract the armature 101 in the direction of core 96 said armature is adapted to move the pin 108 against spring 111 to a position in which the upper end of the pin is spaced from the lower face of the quadrant 57.

The quadrant 57 is provided with two notches 112 and 113 and the pin 108 is so arranged as to enter these notches under the action of spring 111 when the operating handle 60 is in the forward and reverse positions, respectively.

Since the magnet coil 95 is connected to the transmission control wire 7 and therefore adapted to be energized only when the clutch control switch member 4 is in neutral position, it will be noted that with the clutch control switch member 4 in either drive position 8 or 9, the spring 111 will be effective to hold the lock pin 108 in either notch 112 or 113 of the switch quadrant 57. Thus with the clutch on the vehicle engaged, the lock pin 108 will prevent movement, either accidental or otherwise, of the transmission control switch 40 out of the position determining the direction of vehicle movement. By thus locking the transmission selector switch 40 against movement while propelling the vehicle an undesired change in condition of the transmission cannot occur, with possible disastrous results, in case the operator should move the clutch control member 4 to its neutral position in order for instance to coast down a grade.

While coasting with the clutch control switch member 4 in neutral position it will be noted that electric current is supplied to the transmission control wire 7, but obviously it would not be desired to change the condition of the transmission at this time. To prevent such a change from being effected accidentally, as by the operator leaning against or striking the transmission selector switch handle 60, the locking pin 63 in said handle is provided. This pin insures against such accidental movement of handle 60, since it is necessary for the operator to grasp the washer 65 and withdraw the locking pin 63 from one or the other of the bores 68 in the escutcheon plate 46 in order to effect such movement. Thus a conscious or intentional act on the part of the operator is required to change the position of the transmission selector switch 40, due to which any change of the transmission during coasting for instance cannot accidentally occur.

The improved selector switch 40 thus provides for selective conditioning of the transmission when the clutch control switch member 4 is in neutral position causing disengagement of the clutch on the vehicle. The locking pin 108 insures that the position of the transmission selector switch 40 will not be changed while the clutch control switch member 4 is in either of its drive positions so as to thereby eliminate the possibility of disaster to the vehicle or parts thereof upon subsequent movement of the clutch control switch member to neutral position. The plunger 63 in the operation handle 60 prevents an accidental change in the condition of the transmission when the clutch control switch member 4 is in neutral position so that while the vehicle is under motion damage to any part thereof cannot unintentionally occur.

The condition of the transmission should not be changed except when the vehicle is at rest, at which time the clutch switch member 4 will be in neutral position and the transmission control wire 7 will be energized. To change the condition of the transmission at this time the operator merely has to grasp the washer 65 connected to the locking plunger 63 and withdraw said plunger from one or the other of the bores 68 in the escutcheon plate 46 and then turn the handle 60 to the position for obtaining the desired conditioning of the transmission. He may then let go of the washer 65 and the spring 67 will move the plunger 63 into the aligned bore 68 in the escutcheon plate to thereby hold the selector switch in the desired adjusted position until a subsequent and conscious intended act by the operator.

Description of Figs. 5 and 6

The embodiment of the invention disclosed in Figs. 5 and 6 differs from that above described in the following respects:

A plain operating handle 120 is secured to the operating shaft 48 for turning the switch device to its different operating positions. In this handle there is no locking plunger, such as the plunger 63 employed in the handle 60, and the escutcheon plate 46 is not used. The handle 120 is preferably provided with a pointer 121 which in each of the operating positions of the handle is adapted to cover an index member 122 which is provided on the supporting bracket member 45 to indicate to the operator the operating position of the handle. The bracket member 45 may be provided under the handle 121 with legends F and R adjacent the index members 122 as a further aid to the operator for choosing the desired operating position.

In addition to the above, a spring pressed detent 123 is slidably mounted in a suitable bore provided through the plate like member 42 between the locking plunger 108 and the bore in which the shaft bearing member 52 operates. This detent is urged in the direction of the underside of the quadrant 57 which is provided with two recesses 124 adapted to receive said detent in the forward and reverse positions of handle 120. A third recess 125 may, if desired, be provided intermediate the two recesses 124 for receiving the detent 123 in a neutral position of the operating handle 120 intermediate the forward and reverse positions and in which the cam 55 will be so positioned that both of the switch fingers 77 and 79 will open the circuits controlled thereby. On the upper face of the bracket 45 an index member 126 may be provided, intermediate the two index members 122, for indicating the neutral position of the handle 120 and the legend N may be placed on the member 45 adjacent the index member 126 for the operator's convenience. The quadrant 57 may also be provided with a notch 127, located intermediate the notches 112 and 113, for receiving the plunger 108 in the neutral position of the handle 120.

The engagement of the detent 123 in either of the recesses 124 provided in the underface of the quadrant 57 is adapted to resiliently oppose movement of the operating handle 120 out of each of its extreme operating positions, due to which the attention of the operator will be somewhat focused upon the operation of the device to thereby insure that the handle 120 will be moved to the desired position. The interengagement between the detent 123 and any one of the recesses is also adapted to resiliently hold the switch in a selected position when the lock pin 108 is withdrawn from the quadrant 57. Furthermore, when the vehicle is coasting at which time the lock pin 108 will be withdrawn from the quadrant the interengagement of detent 123 with the quadrant will tend to hold the handle 120 against accidental movement. In case the handle 120 should be unintentionally struck and shifted out of a drive position at this time, however, the detent 123 will enter recess 125 and thereby tend to arrest said handle and prevent continued movement to the other drive position which would undesirably condition the transmission to provide for movement of the vehicle in the direction opposite that being traveled.

The purpose of notch 127 in quadrant 57 is to prevent, while the vehicle is being propelled, accidental movement of the handle 120 from a selected driving position to the other driving position in case the handle has not been previously moved to the selected drive position to a sufficient degree to permit the lock pin 108 to enter the notch 112 or notch 113. Under such a circumstance if handle 120 should be accidentally struck it would be moved away from the selected drive position in the direction of the opposite drive position. However, such movement would be arrested in the neutral position by the entry of plunger 108 into the notch 127 as such notch becomes aligned with said plunger, so as to thereby prevent accidental reversing of the transmission under such a remote condition.

Summary

By the use of either of the selector switch devices above described in combination with the clutch control switch 3, the operator of a vehicle may selectively condition the transmission to provide for movement of the vehicle in whichever direction is desired. This conditioning of the transmission can be effected when and only when the clutch control switch is in its neutral position disconnecting the propulsion engine on the vehicle from the drive wheels thereof. In both embodiments of the transmission selector switch the locking magnet device including the coil 95 and the lock pin 108 insures that the switch will not be moved accidentally or otherwise from a selected drive position while the vehicle is in motion, so as to thereby protect the propulsion system as well as other parts of the vehicle against possible damage. The spring pressed plunger 63 in the embodiment shown in Figs. 1 to 4 and the spring pressed detent 123 in the embodiment shown in Figs. 5 and 6, both act to prevent unintentional movement of the selector switch from a chosen operating position to the other operating position while the vehicle is in motion with the clutch control switch 3 in its neutral position. The plunger 63 in handle 60 constitutes a positive means to prevent unintentional or accidental movement of the transmission selector switch out of a selected position since it requires a conscious act on the part of the operator. The detent 124 does not act in the same positive manner as plunger 63 to prevent accidental movement of the switch handle, as will be apparent, but said detent does provide such a resistance to movement of the handle 120 as to call the operator's attention to what is taking place so as to prevent an unintended change in the position of the handle.

Having now described my invention, what I claim as new and desire to secure by Letters Patent is:

1. A vehicle clutch and forward and reverse power transmission control system comprising in combination, manually operative clutch control means having two clutch driving positions for rendering such clutch effective to transmit power and having a normal position between said driving positions for rendering said clutch ineffective to transmit power, transmission control means for selectively conditioning said transmission to provide for either forward movement of the vehicle or movement in the reverse direction and comprising a manually operative selector device movable to a forward position and to a reverse position, movement of said selector device being dependent upon a chosen condition of a control medium, said clutch control means controlling said control medium and providing said chosen condition only in the normal position of said clutch control means, and means controlled by said control medium and operative when said control medium is in other than said chosen condition for locking said selector device against movement.

2. A vehicle clutch and forward and reverse power transmission control system comprising in combination, manually operative clutch control means having two clutch driving positions for rendering such clutch effective to transmit power and having a normal position between said driving positions for rendering said clutch ineffective to transmit power, transmission control means for selectively conditioning said transmission to provide for either forward movement of the vehicle of movement in the reverse direction and comprising a manually operative selector device movable to a forward position and to a reverse position, locking means for securing said selector device against movement, means controlled by said clutch control means and operative in the normal position thereof to operate said locking means to release said selector device for manual movement, and means operative upon movement of said clutch control means out of said normal position to actuate said locking means to secure said selector device against movement.

3. A vehicle clutch and forward and reverse transmission control system comprising in combination, manually operative clutch control means having two clutch driving positions for rendering said clutch effective to transmit power and having a normal position between said driving positions for rendering said clutch ineffective to transmit power, selector means for selectively conditioning said transmission to provide for either forward or reverse movement of the vehicle and comprising a manually operative selector device having a forward position and a reverse position, means for locking said selector device against movement, a magnet operative upon energization to actuate said means to release said selector device for movement, said clutch control means in said normal position effecting energization of said magnet and in said clutch driving position deenergization of said magnet.

4. A vehicle clutch and forward and reverse transmission control system comprising in combination, a manually operative clutch control switch having a clutch driving position for rendering said clutch effective to transmit power and having a normal position for effecting disengagement of said clutch, an electric current supply wire, said manually operative clutch control switch supplying current to said wire in the normal position thereof and cutting off the supply of current to said wire in said clutch driving position, electrically controlled means for selectively conditioning said transmission, a manually operative selector switch having one position for supplying current from said wire to said electrically controlled means to effect the operation thereof to condition said transmission device to provide for forward movement of the vehicle and having another position for supplying current from said wire to said electrically controlled means to effect operation thereof to condition said transmission to provide for reverse movement of the vehicle, and electro-magnetically controlled means associated with said selector switch and operative upon deenergization to lock said selector switch against movement and upon energization to release said selector switch for movement, said electro-magnetically controlled means being connected to and controlled from said wire.

5. A vehicle clutch and forward and reverse transmission control system comprising in combination, a manually operative clutch control means having a clutch driving position for rendering said clutch effective to transmit power and having a normal position for effecting disengagement of said clutch, a transmission control wire connected to said manually operative clutch control means and supplied with electric current in the normal position thereof, said manually operative clutch control means cutting off the supply of current to said transmission control wire in said clutch driving position, electrically controlled means for controlling the positioning of said transmission including means operative upon the supply of current to a forward wire to condition said transmission to provide for forward movement of the vehicle and upon supply of electric current to a reverse wire to condition said transmission device to provide for movement of the vehicle in the reverse direction, a manually operative selector switch to which all of said wires are connected and being movable to one position for connecting said transmission control wire to said forward wire and to another position for connecting said transmission control wire to said reverse wire, the forward or reverse wire not connected to said transmission control wire in said positions of said selector switch being deenergized, a locking member associated with said selector switch operative to secure same against movement, a magnet operative upon energization to release said locking member from said selector switch to provide for movement thereof, said magnet being connected to said transmission control wire, and spring pressed means associated with said selector switch operative to define the different positions thereof and to resiliently oppose movement of said switch out of said positions.

6. A vehicle clutch and forward and reverse transmission control system comprising in combination, a manually operative clutch control means having a clutch driving position for rendering said clutch effective to transmit power and having a normal position for effecting disengagement of said clutch, a transmission control wire connected to said manually operative clutch control means and supplied with electric current in the normal position thereof, said manually operative clutch control means cutting off the supply of current to said transmission control wire in said clutch driving position, electrically controlled means for controlling the positioning of said transmission including means operative upon the supply of current to a forward wire to condition said transmission to provide for forward movement of the vehicle and upon supply of electric current to a reverse wire to condition said transmission device to provide for movement of the vehicle in the reverse direction, a manually operative selector switch to which all of said wires are connected and being movable to one position for connecting said transmission control wire to said forward wire and to another position for connecting said transmission control wire to said reverse wire, the forward or reverse wire not connected to said transmission control wire in said positions of said selector switch being deenergized, a locking member associated with said selector switch operative to secure same against movement, a magnet operative upon energization to release said locking member from said selector switch to provide for movement thereof, said magnet being connected to said transmission control wire, said selector switch comprising a fixed part and a handle movable manually relative to said fixed part to said positions, a plunger associated with said handle for cooperation with said relatively fixed part for locking said handle in either of its positions, a spring acting on said plunger for urging same into cooperative locking relation with said relatively fixed part, and a button connected with said plunger adapted to be grasped by the fingers of an operator for releasing said plunger from said fixed part to provide for movement of said handle to its different positions.

MORTIMER B. CAMERON.